(No Model.)  4 Sheets—Sheet 1.
J. J. JOHNSTON.
MANUFACTURE OF IRON.
No. 312,641. Patented Feb. 24, 1885.
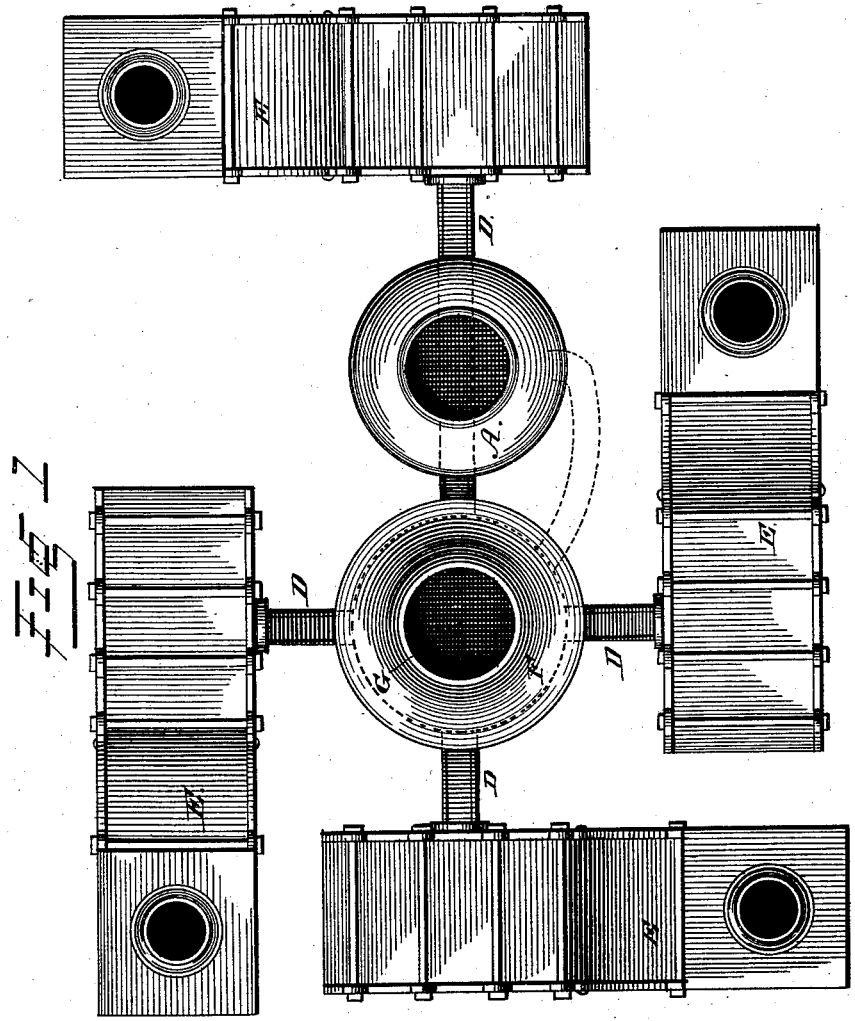
WITNESSES:
INVENTOR.
James J. Johnston (No Model.)　　　　　　J. J. JOHNSTON.　　　　4 Sheets—Sheet 2.
MANUFACTURE OF IRON.
No. 312,641.　　　　　　Patented Feb. 24, 1885.
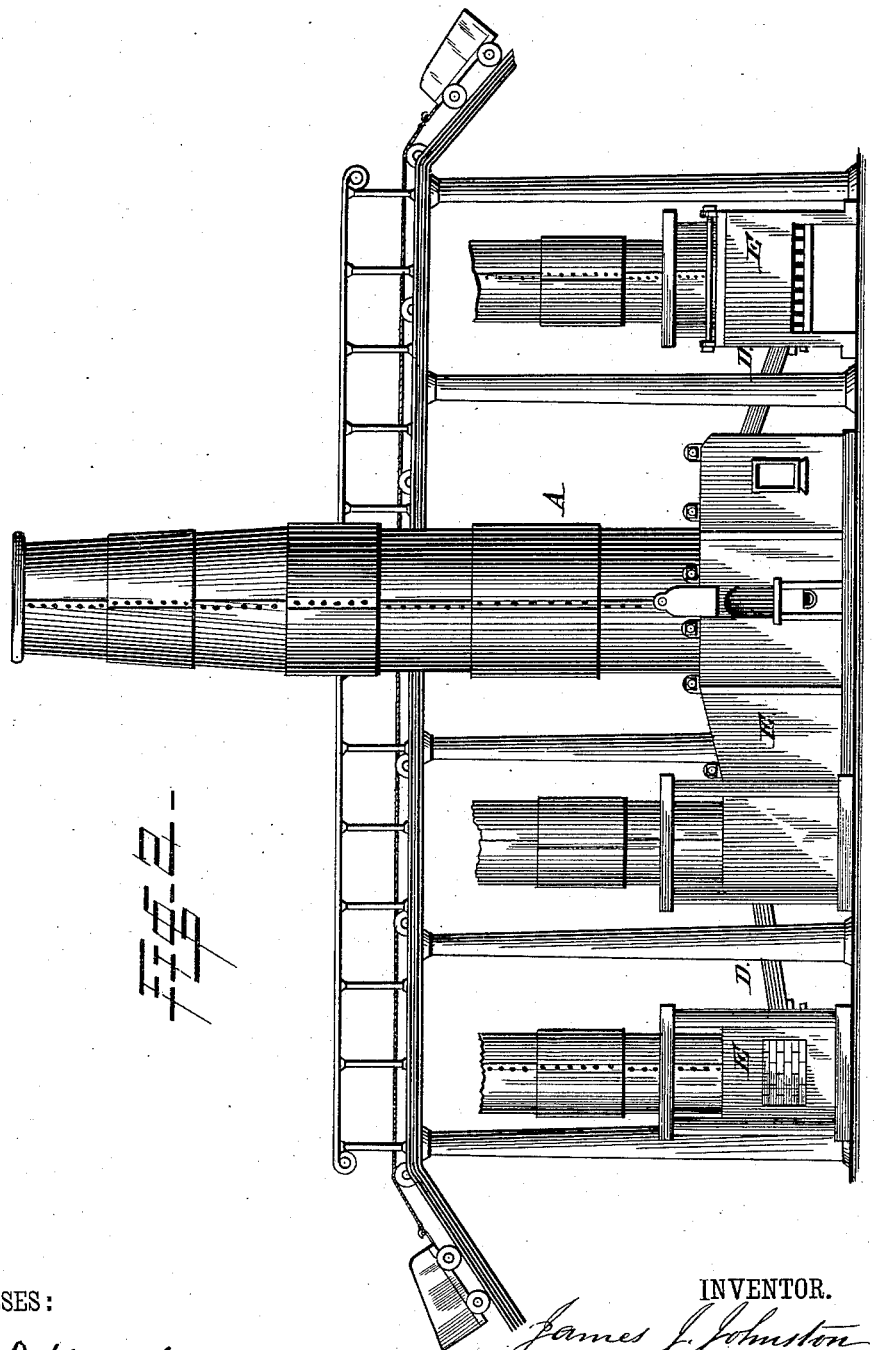

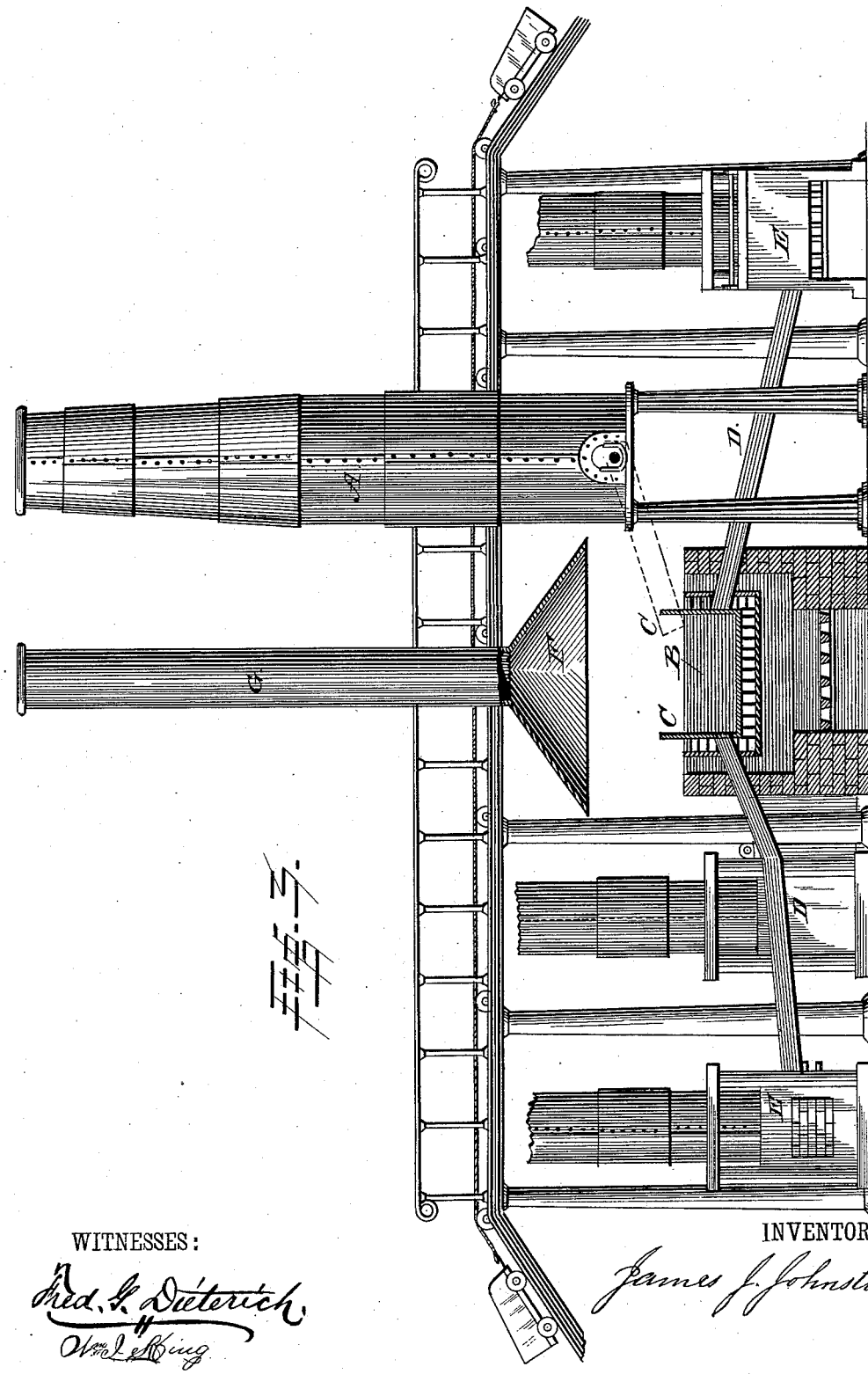

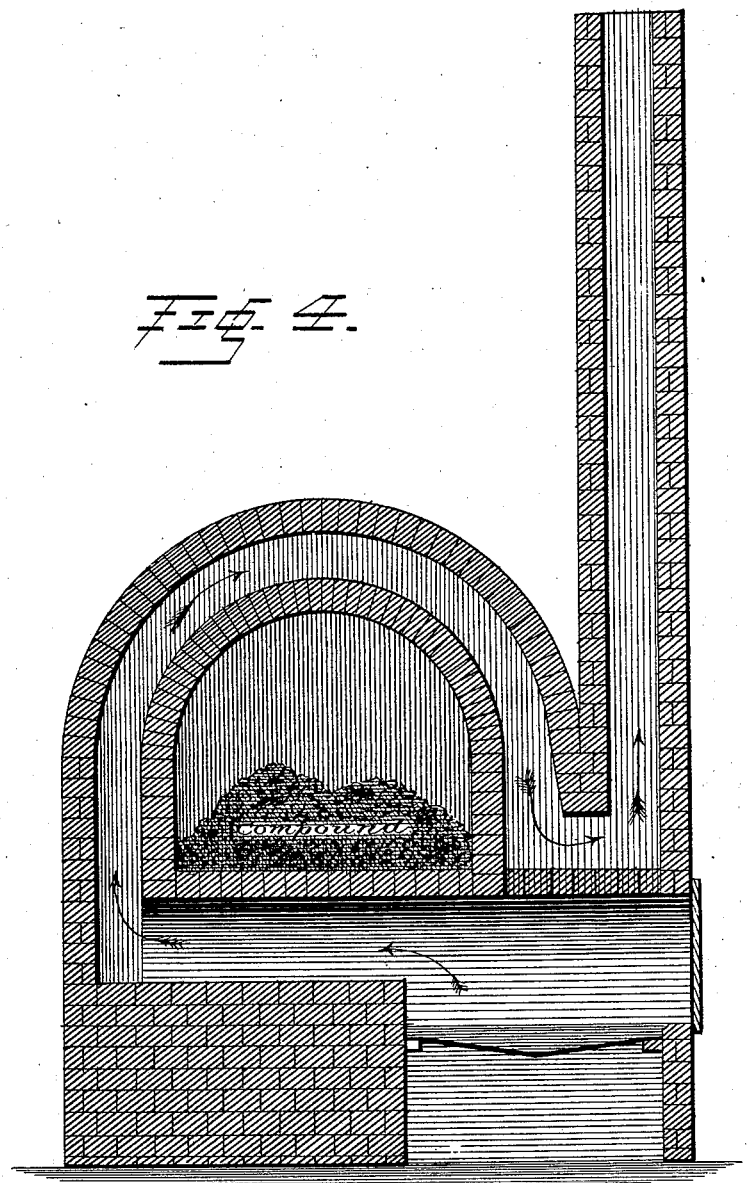

UNITED STATES PATENT OFFICE.

JAMES J. JOHNSTON, OF COLUMBIANA, OHIO, ASSIGNOR OF SEVEN-EIGHTHS TO WILLIAM W. GIBBS, OF PHILADELPHIA, AND ALBERT C. ELLIS, OF PITTSBURG, PENNSYLVANIA.

MANUFACTURE OF IRON.

SPECIFICATION forming part of Letters Patent No. 312,641, dated February 24, 1885.

Application filed December 19, 1883. (No specimens.)

*To all whom it may concern:*

Be it known that I, JAMES J. JOHNSTON, of Columbiana, in the county of Columbiana and State of Ohio, have invented a certain new and useful Improvement in the Manufacture of Iron; and I do hereby declare that the following is a full, clear, and exact description thereof, reference being had to the accompanying drawings, and to the letters of reference marked thereon.

My invention has for its object the purification of metal known as "pig-iron," and subsequently manufacturing it into malleable iron, commonly called "wrought-iron," in the manner and by the means hereinafter described.

The nature of my invention consists in the method of purifying molten pig-iron by mixing therewith a highly-heated compound consisting of iron ore, lime, and salt, and subsequently charging the molten and purified metal into a highly-heated furnace, where it is subjected to a high degree of heat, after which it is formed into balls, which are subjected to the ordinary squeezing or hammering and rolling process, as will hereinafter more fully and at large appear.

To enable others skilled in the art with which my invention is most nearly connected to make and use it, I will proceed to describe its construction and operation.

In the accompanying drawings, which form part of this specification, Figure 1 is a top view or plan of a melting-furnace, receiving and purifying chamber surrounded with a series of reheating and balling furnaces. Fig. 2 is a side elevation of the same. Fig. 3 is a side elevation of the same, representing one of the reheating and balling furnaces removed. Fig. 4 is a vertical section of a furnace for heating the purifying compound.

The melting-furnace A may be of any known construction; but preference is given to that of the ordinary cupola, or that construction of the cupola described in my application for Letters Patent of the United States bearing even date with this application, and marked Case B. The receiving and purifying chamber B is constructed, by preference, of plate-iron, and is provided with gates C, which communicate with channels D, which communicate with the working-chambers of the reheating-furnaces E. Above and over the receiving-chamber is arranged a canopy, F, having a stack, G, for carrying off the gases and waste heat. The interior of the receiving-chamber B should be lined with good fire-brick or other material capable of withstanding great heat, and this lining should be coated with a paste formed by adding water to the compound of ore, lime, and salt, which will hereinafter be more fully described.

The receiving-chamber B must be thoroughly dry and highly heated before allowing the molten metal to flow into it. The reheating and balling furnace is constructed in all respects similar to the ordinary puddling-furnace, and furnished with all its appendages and the tools common to it.

The compound herein mentioned consists of about eighty (80) parts of good iron ore—such as "Lake Superior iron" or "Missouri iron ore"—about ten (10) parts of lime, and about ten (10) parts of salt. The iron ore is pulverized, the lime reduced to a dry powder by a slaking process. The ore, lime, and salt are then thoroughly mixed, and the mixed mass sifted by passing it through a No. 8 or No. 16 sieve.

The proportions of ore, lime, and salt may be varied to suit different brands, kinds, and combinations of pig metal that may be used for the manufacture of malleable iron, or that may be subjected to the purifying process herein described, and good results be produced thereby. Therefore I do not confine myself to the proportions of ore, lime, and salt herein specified for forming the purifying compound.

The compound prepared as herein described is charged into the heating-chamber I of the furnace shown in Fig. 4, and is highly heated. I have found by experience that the compound can be used in a cold state if the articles of which it is formed are dry and a very good result obtained in the process of purifying the molten metal; but the best results are obtained in using the compound in a highly-heated condition.

The pig metal or combination of different brands or grades of pig metal is melted in the furnace or cupola A, and the melted metal at proper intervals allowed to flow into the receiving-chamber B. Then about ten to twenty pounds of the hereinbefore-described compound is added to each one hundred pounds of the molten metal, and thoroughly stirred through said molten metal in said receiving-chamber B, after which the molten metal upon opening one of the gates C is allowed to flow through one of the channels D into the desired reheating and balling furnace, where it is subjected to a high degree of heat, care being taken to frequently stir the melted metal for preventing it from becoming attached to the side walls and bottom of the working-chamber of the furnace during its transmutation from molten pig metal to malleable or wrought iron. The progress of said transmutation may readily be observed by the formation of lumps having ragged or jagged surfaces floating through the molten metal. Soon as these lumps appear in considerable number the operator should commence the process of gathering them together for the purpose of forming balls of iron of the desired size, known as "puddled balls." This can be readily accomplished in view of the fact that these floating lumps are of a pasty nature, and will readily adhere to each other. This process of forming the balls is well known to the art, and need not be further described. When the iron is "balled," the balls of iron are removed from the furnace and subjected to the action of the squeezer or hammer, and may be rolled into muck-bar in the usual manner.

The side walls and bottom of the working-chamber of the reheating and balling furnace is constructed and prepared in the same manner and by the same means as that of the ordinary puddling-furnace.

The method of manufacturing malleable iron hereinbefore described may be used in connection with the blast-furnace or ore-smelting furnace employed for the manufacture of pig-iron, thereby adapting said method to the making of malleable iron direct from the ore.

The method hereinbefore described for purifying pig-iron will dispense with the necessity of refining-fires, refining-furnaces, and knobling-fires usually employed in connection with the ordinary balling or puddling process for manufacturing superior and special brands of iron for special purposes, and said method may also be used in connection with the blast-furnace or ore-smelting furnace or any of the known kinds of melting-furnaces used for the manufacture of or for the melting of pig-iron.

It will be observed that in manufacturing malleable iron by the method herein described from pig-iron, the latter is first melted, then purified by mixing with the melted iron the compound hereinbefore described, and subsequently reheating said purified metal in a reheating-furnace, then balling it, and forming it into blooms or muck-bar in the usual manner and by the ordinary means. This method of manufacturing malleable iron dispenses with the ordinary puddling process, with a saving of fuel, labor, and time, and at a diminished cost, and at the same time producing a superior quality of malleable iron, equal to the best brands known to the art.

I am aware that it has heretofore been proposed to use a mixture of iron ore, lime, and alkaline chlorides in metallurgical operations, principally as a fixing or fettling for the furnace-bed. Such mixture has not, however, to my knowledge, ever before been employed in the manipulations set forth in my claims, and for the purpose of purifying and partially decarbonizing the crude metal on its way from the cupola to the balling-furnace, by thoroughly mixing the compound with the molten iron in a heated receptacle intermediate between the two furnaces.

I am also aware that it has been proposed to purify crude pig taken from the cupola by running it into a furnace lined with carbonaceous materials and stirring over its surface a mixture of hydrates of the alkalies, carbonaceous additions being also employed upon the surface of the metal for the purpose of maintaining a reducing atmosphere. The said process purports to remove phosphorus from the metal, leaving a purified pig, which may thereafter be puddled and balled. It is, however, well established in the metallurgic art that the phosphorus separated from iron by a basic slag is taken out as phosphide of iron. The presence of a reducing atmosphere, as in the process referred to, decomposes this phosphide, causing the phosphorus to drop back into the body of the metal, thereby neutralizing the action of the slag. In said process, moreover, by reason of the retention of all the carbon of the crude pig, the subsequent puddling operation is not shortened or lightened, as in my invention.

Having thus described my improvement, what I claim as of my invention is—

1. The method herein described for manufacturing malleable iron, which consists in melting pig-iron, conveying it into a heated receiving-chamber, thoroughly mixing with it therein the compound herein described, consisting of iron ore, lime, and salt, and then transferring the metal into a balling-furnace, subjecting it to a high degree of heat in the latter, and finally forming it into balls, substantially as set forth.

2. The method herein described for manufacturing malleable iron, which consists in melting pig-iron, conveying it into a heated receiving-chamber, thoroughly mixing with it therein the compound herein described, consisting of iron ore, lime, and salt, such compound being charged in a heated state, then transferring the metal into a balling-furnace, subjecting it to a high degree of heat in the latter, and finally forming it into balls, substantially as set forth.

JAMES J. JOHNSTON.

Witnesses:
E. JOHNSTON,
WM. E. DYRE.